Patented Oct. 9, 1951

2,571,039

UNITED STATES PATENT OFFICE 2,571,039

SILOXANE ELASTOMERS COMPRISING A MODIFIED ACID POLYMER AND FILLER

James Franklin Hyde, Corning, N. Y., assignor to Dow Corning Corporation, Midland, Mich., a corporation of Michigan No Drawing. Application April 12, 1950, Serial No. 155,550

7 Claims. (Cl. 260—37)

This invention relates to flexible, resilient polysiloxanes and to their methods of preparation.

Previous siloxane elastomers have been prepared by vulcanizing various siloxane polymers with organic peroxides, usually benzoyl peroxide or tertiary butyl perbenzoate. The vulcanization with such agents requires temperatures of at least 110° C. The instant invention deals with new elastomeric siloxanes which are prepared by curing certain types of acid siloxane polymers at room temperature.

It is an object of this invention to provide a new method for preparing siloxane elastomers which obviates the necessity of using organic peroxides. Another object is to provide a method of preparing elastomers which will make feasible the incorporation of fillers such as cork. Another object is to prepare siloxane rubbers filled with carbon black which have efficiencies upwards of 1,000. (The efficiency is the product of the per cent elongation at break, times tensile in pounds per square inch divided by 1,000.) Other objects and advantages will appear in the following description.

In accordance with this invention, a readily deformable acid polymer of at least 2,000 cs. viscosity is compounded with a filler and reacted with a silane of the formula $R_nSi(OR')_{4-n}$ where R is a monovalent hydrocarbon radical free of aliphatic unsaturation, R' is an alkyl radical of less than 9 carbon atoms, and $n$ has a value from 0 to 1 and liquid partial hydrolyzates thereof. The acid polymer is the reaction product of a polysiloxane having from 1.9 to 2.1 hydrocarbon radicals per silicon atom and an acidic compound selected from the group $P_2O_5$ phosphoric acids, and sulfuric acid, said acidic compound being present in amount such that the atomic ratios of P to Si and S to Si are from 1:50 to 1:50,000. The silane is employed in amount such that there is present in the reaction mixture at least one molecule of silane per two phosphorous or sulfur atoms.

The acid polymers employed in this invention range from relatively fluid materials of 2,000 cs. viscosity to non-flowing polymers of upwards of 30,000,000 cs. The high-viscosity materials are essentially non-flowing at room temperature, and their viscosities are determined by the well-known "falling ball" method. Theoretically, there is no upper limit to the viscosity of the polymers which may be employed in this invention. Preferably, however, the material should be either readily deformable in the solid state or soluble in an organic solvent in order that they may be readily compounded with the filler.

The acid polymers of this invention may be prepared by polymerizing organopolysiloxanes with the above-defined acidic compounds until the desired viscosity is obtained. The resulting polymers contain the acid groups linked to silicon atoms through POSi and SOSi linkages. However, it is not necessary for the purposes of this invention that the polysiloxane be advanced to the desired state of polymerization by the acids employed herein. Alternatively, the siloxane may first be polymerized with an alkaline catalyst or with a metallic salt until it has reached the desired viscosity, and the resulting polymer may then be reacted with the acidic compounds herein employed.

The latter method is of particular value when low concentrations of the acidic compound are employed since polymerization in such cases is often slow. For example, when it is desired to employ a polymer having a P to Si ratio of 1 to 1,000 or below greater speed is accomplished by first polymerizing the siloxane with say KOH until the desired viscosity is obtained. At this stage the alkaline polymer may be washed free of alkali and then reacted with the acid or the acidic compound may be added in excess of the amount sufficient to neutralize the alkali.

Reaction of the acid compound with the siloxane is effected at temperatures ranging from 25° C. to 250° C. The precise temperature will vary, depending upon the acid compound employed and the state of polymerization desired. The acid polymers of this invention are sensitive to moisture, as is shown by the fact that the viscosity of the polymer decreases upon exposure to moisture. This effect is most marked in the case of the $P_2O_5$ siloxane polymers. For example, a siloxane-$P_2O_5$ polymer of 10,000,000 cs. viscosity will decrease to 10,000 cs. viscosity upon exposure to the atmosphere. However, both the initial 10,000,000 cs. material and the final 10,000 cs. material will produce satisfactory elastomers when reacted with silanes as shown below.

This breakdown in the presence of moisture is not exhibited by the polymer-silane reaction products. Thus, after a $P_2O_5$ siloxane polymer is reacted with, say, ethyl orthosilicate in accordance herewith, the resulting elastomer is stable to moisture. The reasons for this behavior are not clearly understood. It is believed, however, that the silane reacts with the acid groups in the acid polymer and thereby produces cross links in the polymer through SiOSi linkages.

It has been found that desirable elastomers are obtained when the ratio of phosphorus and sulfur atoms to silicon atoms varies from 1:50 to 1:50,000. Acid polymers having ratios greater than 1:50 produce materials which are deficient in elongation. When the ratio is greater than 1:50,000, the materials obtained upon reaction with the silane do not readily set to elastomeric materials.

The acid polymer is compounded with a filler in amount between five parts by weight filler per one hundred parts of polymer to three hundred parts by weight filler per one hundred parts by weight polymer. The compounding may be carried out in any suitable manner. It has been found convenient to disperse the filler in the polymer on a mill. Milling is continued until a uniform mixture is obtained.

Elastomeric materials of the type herein described are not obtained in the absence of a filler. Thus, if an acid polymer is merely reacted with a silane, the resulting product is a soft, resilient gel which is of no value as an elastomeric material. Obviously, the filler must be added before curing of the product takes place.

Since the curing of the products of this invention can be carried out at 30° C., organic as well as inorganic fillers may be advantageously incorporated into the elastomers. Suitable fillers include such materials as cork, cotton linters, wood flour, etc., and inorganic materials such as silica aerogels, fume silicas, asbestos, $TiO_2$, $ZnO$, $Fe_2O_3$, $Cr_2O_3$, clay, diatomaceous earth, and carbon black. The particular properties desired in the elastomer will determine the choice of filler. For example, excellent gaskets are obtained with cork-filled elastomers, while maximum heat resistance will be obtained with $TiO_2$ or silicas.

The compounded polymer is reacted with a silane of the type $R_nSi(OR')_{4-n}$ where R is a monovalent hydrocarbon radical free of aliphatic unsaturation, R' is alkyl, and n has a value from 0 to 1. Examples of such silanes which are operative in this invention are ethyl orthosilicate, methyl orthosilicate, propyl orthosilicate, octylorthosilicate, methyl triethoxysilane, phenyl trimethoxysilane, propyl tributoxysilane, octyltriethoxysilane and tolyltributoxysilane and mixtures thereof.

Liquid partial hydrolyzates of the above silanes also produce elastomers when reacted with the compounded polymer. These partial hydrolyzates contain SiOSi linkages together with alkoxy and hydrocarbon radicals. Examples of such materials are linear silanes of the formula

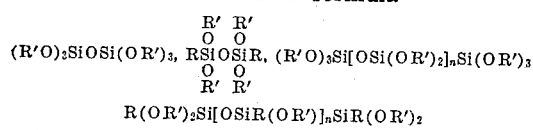

$$R(OR')_2Si[OSiR(OR')]_nSiR(OR')_2$$

and partially cross linked silanes of the type

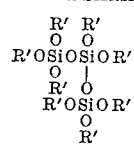

and

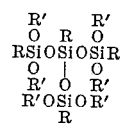

The silanes must not be condensed to the point where they are no longer liquid.

The amount of silane employed should be at least sufficient that there is one molecule of silane per two phosphorous or sulfur atoms in the acid polymer. Normally, the amount of silane employed is well in excess of this minimum amount but in general, it is preferred that the silane be employed in amount less than fifteen parts by weight silane per one hundred parts by weight polymer.

Reaction between the silane and acid polymer proceeds at temperatures ranging 25° C. to 300° C. Preferably the temperature should not exceed 250° C. Upon mixing the silane and the polymer, reaction begins at once, as is shown by toughening of the polymer and loss of tackiness. In general, the time for setting varies between one minute and twenty-four hours, depending upon the relative amounts of silane and acid present. The silane and polymer may be mixed in any desired manner, but excellent results are obtained by adding the silane to the compounded acid polymer on a mill. Milling may be continued until the ester is thoroughly dispersed and until the product has become sufficiently coherent and non-tacky that it may be conveniently removed from the rolls.

The material is still sufficiently plastic that it may be moulded, pressed, or extruded into the conventional shapes of elastomeric products.

If desired a solvent may be added along with the silane in order to aid in dispersing it throughout the polymer mass. Suitable solvents are nitriles, hydrocarbons, ethers and alcohols.

The compounded material may then be allowed to cure at 30° C. This curing results in an increase in the stress-strain properties of the product.

The siloxanes employed to prepare the elastomers of this invention have between 1.9 and 2.1 alkyl and phenyl radicals per silicon atom. These siloxanes may be either homopolymers such as dimethylsiloxane, phenylmethylsiloxane, diethylsiloxane, dipropylsiloxane; or they may be copolymers of the various diorganosiloxanes. In addition, the polymers may contain siloxane units of the type $RSiO_{3/2}$ and $R_3SiO_{1/2}$, where R is alkyl or phenyl. In all cases the various units should be so proportioned that at least 50 per cent of all of the organic radicals are alkyl.

This invention includes within its scope the following acidic compounds: $P_2O_5$, sulfuric acid, and phosphoric acids. The term phosphoric acids includes metaphosphoric acid, pyrophosphoric acid, orthophosphoric acid, and alkyl esters of such phosphoric acids. The latter include compounds such as ethyl phosphate and diethyl phosphate. Any ester of an acid of pentavalent phosphorus which ester contains at least one acidic hydrogen may be employed in this invention.

The present method of preparing siloxane elastomers produces materials which are not obtainable by any other known method. For example, it is impossible to obtain a satisfactory vulcanization of a cork-filled polymer with any known organic peroxide. When such is attempted, the resulting material is a tacky, non-coherent mass. By the present method, however, cork-filled, resilient materials are obtained which are excellent for use as gaskets, particularly in conjunction with seals for containers of chlorinated organic liquids.

Past attempts to obtain a satisfactory siloxane rubber containing carbon black as a filler have been unsuccessful. This is due to the fact that with benzoyl peroxide it is impossible to obtain vulcanization in the presence of carbon black. Tertiary butyl perbenzoate produces vulcanization, but the resulting materials, as is shown in the copending application of Earl L. Warrick, Serial No. 651,383, filed March 1, 1946, now abandoned, have efficiencies ranging from 25 to 35. By contrast, the carbon black-filled elastomers of this invention have efficiencies upwards of 1,000. Thus, it can be seen that elastomeric materials may be prepared by this method which have stress-strain properties of an entirely different order of magnitude from those previously obtainable.

The present materials are useful in applications for gaskets, electrical insulation, and other uses for which siloxane elastomers are normally employed.

The following examples are illustrative only and are not to be considered as limiting the invention.

EXAMPLE 1

74 grams of octamethylcyclotetrasiloxane and 0.142 gram of $P_2O_5$ were mixed and heated at 100° C. to 150° C. for fifty hours. At the end of this time the acid polymer was a non-tacky, soft solid with a viscosity of about 10,000,000 cs. at 25° C. The P to Si atomic ratio was 1:500.

38 grams of the polymer were milled with 38 grams of ZnO until a uniform mix was obtained, and then 1.9 grams of ethyl orthosilicate was added and milling was continued. Reaction began at once as shown by an increase in the coherence of the sample. After about ten minutes the material was removed from the mill and molded under pressure into a sheet. All of the compounding and molding was carried out at 30° C. The material was then allowed to cure for two days at room temperature and finally heated three hours at 250° C. The resulting elastomer had a tensile strength of 225 p. s. i. and an elongation at break of 275 per cent.

EXAMPLE 2

Using the general procedure of Example 1, various acid polymers composed of dimethylsiloxane and $P_2O_5$ were compounded with the fillers and reacted with the silanes as shown in the table below. In the table the parts by weight filler and parts by weight silane are both relative to one hundred parts by weight polymer.

nel black until a uniform mix was obtained. Then five parts of ethyl orthosilicate was added, and milling was continued for one minute. The product set to an elastic product which was allowed to cure for sixteen days at 30° C. The resulting elastomer had a tensile strength of 558 p. s. i. and an elongation at break of 600 per cent.

EXAMPLE 4

The procedure of Example 3 was repeated, except that orthophosphoric acid was employed as the acidic compound, and the viscosity of the resulting polymer was 37,800,000 cs. The resulting elastomer had a tensile strength of 650 p. s. i. and an elongation at break of 200 per cent. Other phosphoric acids which have been employed to prepare elastomers are metaphosphoric acid and ethylphosphoric acid.

EXAMPLE 5

One hundred parts by weight of a 39,000,000 cs. dimethylpolysiloxane containing $P_2O_5$ in the ratio of one P atom to five hundred Si atoms, was milled with thirty-three parts of cork dust until a uniform mix was obtained. The mixture was further milled for five minutes with five parts of ethyl orthosilicate. The product was removed from the mill, pressed into a sheet, and allowed to stand twenty-four hours at 30° C. The resulting product was a flexible, elastic material which is suitable for gaskets.

EXAMPLE 6

The procedure of Example 5 was repeated, using one hundred parts polymer, thirty-one parts cork dust, 6.7 parts calcined carbon black, and five parts ethyl orthosilicate. The resulting product was a flexible, elastic material which is suitable for use as gaskets.

EXAMPLE 7

An acid polymer containing one phosphorous atom to 200 silicon atoms was prepared by reacting 0.1136 gram of $P_2O_5$ with 54.4 grams of cyclicphenylmethylsiloxane. Reaction was carried out at a temperature of 85° C. for 100 hours and the material was thereafter allowed to stand overnight at room temperature. The resulting polymer was a non-flowing material having a viscosity of 9,163,000 cs.

100 parts by weight of this polymer was milled

Table

| $(CH_3)_2SiO-P_2O_5$ Polymers | | Filler | Amount Filler, in Parts by Weight | Silane | Amount Silane, in Parts by Weight | Cure | Tensile, in p. s. i. | Per Cent Elongation at break |
|---|---|---|---|---|---|---|---|---|
| P/Si | Visc., in cs. at 25° C. | | | | | | | |
| 1/500 | 5,082 | Channel black | 29 | $(C_2H_5O)_4Si$ | 5 | 19 days at 30° C | 882 | 400 |
| 1/500 | 6,500,000 | Calcined black | 34.8 | do | 4.9 | 11 days at 30° C | 1129 | 450 |
| 1/250 | 10,000,000 | Channel black | 29 | do | 5 | 60 days at 30° C | 1315 | 650 |
| 1/100 | 23,813,375 | do | 29 | do | 2 | 30 days at 30° C | 375 | 600 |
| 1/1500 | 1,000,000 | do | 29 | do | 5 | 46 days at 30° C | 869 | 550 |
| 1/500 | 6,500,000 | Fume Silica / Channel black | 15 / 15 | do | 5 | 3 days at 30° C | 468 | 225 |
| 1/1000 | 10,000,000 | $TiO_2$ | 50 | do | 10 | 1 day at 30° C | 351 | 350 |
| 1/500 | 25,000,000 | $Cr_2O_3$ | 50 | do | 5 | 30 days at 30° C | 275 | 200 |
| 1/250 | 25,000,000 | ZnO / Channel black | 49 / 2.5 | $CH_3Si(OC_2H_5)_3$ | 5 | 2 days at 30° C | 131 | 100 |

EXAMPLE 3

148 grams of octamethylcyclotetrasiloxane was mixed with 0.92 gram of 98 per cent $H_2SO_4$ and heated at 100° C. to 120° C. until the viscosity of the polymer reached 575,000,000 cs. One hundred parts by weight of the polymer was then milled with twenty-nine parts of chanwith 21.6 parts by weight carbon black until a uniform mixture was obtained. 5 parts by weight ethylorthosilicate was added and milling continued until the material became coherent. It was then removed from the rolls and pressed into a sheet. The material was allowed to stand at 30° C. for two days whereupon it had a tensile strength of 250 pounds per square inch and an elongation at break of 200 per cent.

EXAMPLE 8

An acid polymer was prepared by reacting a copolymer containing 95 mol per cent dimethylsiloxane and 5 mol per cent phenylmethylsiloxane with $P_2O_5$ in amount such that the P to Si ratio was 1 to 500. The reaction was carried out by heating the mixture at 85° C. until a stiff non-flowing polymer was obtained. 22.17 parts by weight of this polymer was milled with 8.86 parts by weight carbon black until a uniform mixture was obtained and then 1.1 parts by weight ethylorthosilicate was added and milling was continued until a coherent product was obtained. The product was removed from the mill and pressed into a sheet. The material was allowed to age at 30° C. for several days whereupon it had a tensile strength of 557 p. s. i. and an elongation at break of 500 per cent.

EXAMPLE 9

Elastomeric materials were prepared in accordance with the method of Example 8 using diethylsiloxane and ethylmethylsiloxane. The products obtained had tensile strength in excess of 250 p. s. i. and elongation at break in excess of 200 per cent.

EXAMPLE 10

Elastomers are obtained when the following silanes are employed in accordance with the products of Example 8: i-propylorthosilicate, phenyltriethoxysilane and octyltrimethoxysilane.

EXAMPLE 11

100 parts by weight of a 17,000,000 cs. dimethylsiloxane polymer containing $P_2O_5$ in amount of one P atom to 250 Si atoms, was milled with 20 parts by weight of shredded asbestos and then with five parts by weight ethylorthosilicate. Milling was continued for 10 minutes, after addition of the silane. The product was removed from the mill and pressed into a sheet. After 24 hours at 30° C. the material set to a tough resilient product.

EXAMPLE 12

Dimethylsiloxane polymer was polymerized with $P_2O_5$ in amount of one P to 500 Si until the viscosity at 25° C. reached 59,000,000 cs. The polymer was milled with 40 parts by weight carbon black and 1.8 parts by weight MgO both based upon the weight of polymer.

Ethylorthosilicate was exposed to atmospheric moisture and then distilled and separated into three fractions (1) B. R. up to 174° C., (2) B. R. 174° C. to 250° C. and (3) a liquid residue boiling above 250° C.

Fraction (2) was milled with a portion of the above acid polymer in amount of five parts by weight of the partially hydrolyzed ester per 100 parts polymer. After 2 minutes the compounded material was removed from the mill and heated 24 hours at 250° C. The resulting elastomer had a tensile strength of 593; p. s. i. and an elongation at break of 250 per cent.

Fraction (3) was milled with another portion of the above compounded polymer in amount of five parts by weight of partially hydrolyzed ester per 100 parts of polymer. After 2 minutes the material was removed from the mill and heated 24 hours at 250° C. The elastomer had a tensile strength of 543 p. s. i. and an elongation at break of 200 per cent.

That which is claimed is:

1. The method of preparing elastomeric polysiloxanes from a readily deformable acid polymer of at least 2,000 cs. viscosity at 25° C., which polymer is composed of a polysiloxane having from 1.9 to 2.1 hydrocarbon radicals per silicon atom, said radicals being selected from the group consisting of alkyl and phenyl radicals, at least 50 per cent of said radicals being alkyl, and an acidic compound selected from the group consisting of $P_2O_5$, phosphoric acids, and sulfuric acid, in amount such that the atomic ratio of P to Si and S to Si is from 1:50 to 1:50,000, which method comprises compounding said acid polymer with a filler in amount from 5 to 300 parts by weight filler per 100 parts by weight polymer and reacting the compounded material at a temperature from 25° C. to 300° C., with a silane selected from the group consisting of $R_nSi(OR')_{4-n}$ and liquid partial hydrolyzates thereof, where R is a monovalent hydrocarbon radical free of aliphatic unsaturation, R' is an alkyl radical of less than 9 carbon atoms and $n$ has a value from 0 to 1, said silane being employed in amount such that there is at least one silane molecule per two phosphorous and sulfur atoms.

2. A composition of matter composed of a readily deformable acid polymer of at least 2,000 cs. viscosity at 25° C. which polymer is composed of a polysiloxane having from 1.9 to 2.1 hydrocarbon radicals per silicon atom, said radicals being selected from the group consisting of alkyl and phenyl radicals, at least 50 per cent of said radicals being alkyl and an acidic compound selected from the group consisting of $P_2O_5$, phosphoric acids, and $H_2SO_4$, said acidic compound being present in amount such that the atomic ratio of P to Si and S to Si ranges from 1:50 to 1:50,000, a filler in amount from 5 to 300 parts filler per 100 parts polymer and a silane selected from the group consisting of $R_nSi(OR')_{4-n}$ and liquid partial hydrolyzates thereof, in which R is a monovalent hydrocarbon radical free of aliphatic unsaturation, R' is an alkyl radical of less than 9 carbon atoms and $n$ has a value from 0 to 1, said silane being present in amount of at least one molecule of silane per two atoms of P and S.

3. A composition of matter in accordance with claim 2 in which the siloxane is dimethylsiloxane.

4. A composition of matter in accordance with claim 2 in which the siloxane is phenylmethylsiloxane.

5. A composition of matter composed of a readily deformable acid polymer of at least 2,000 cs. viscosity at 25° C. which polymer is composed of dimethylpolysiloxane and $P_2O_5$ in amount such that the P to Si atomic ratio is from 1:50 to 1:50,000, carbon black in amount from 5 to 300 parts by weight carbon black per 100 parts by weight siloxane, and a silane selected from the group consisting of ethylorthosilicate and liquid partial hydrolyzates thereof, in amount of at least one molecule of silane per two atoms of phosphorous.

6. A composition of matter composed of a readily deformable acid polymer of at least 2,000 cs. viscosity at 25° C., which polymer is composed of dimethylpolysiloxane and $P_2O_5$ in amount such that the atomic ratio of P to Si is from 1:50 to 1:50,000, cork dust in amount from 5 to 300 parts by weight cork per 100 parts by weight siloxane, and a silane selected from the group consisting of ethylorthosilicate and liquid partial hydrolyzates thereof, in amount of at least one molecule of silane per two phosphorous atoms.

7. A composition of matter composed of a readily deformable acid polymer of at least 2,000 cs. viscosity at 25° C. which polymer is composed of phenylmethylpolysiloxane and $P_2O_5$ in amount such that the P to Si atomic ratio is from 1:50 to 1:50,000, carbon black in amount from 5 to 300 parts by weight carbon black per 100 parts by weight siloxane and a silane selected from the group consisting of ethylorthosilicate and liquid partial hydrolyzates thereof, in amount of at least one molecule of silane per two atoms of phosphorous.

JAMES FRANKLIN HYDE.

REFERENCES CITED

The following references are of record in the file of this patent:

UNITED STATES PATENTS

| Number | Name | Date |
| --- | --- | --- |
| 2,392,713 | Wright et al. | Jan. 8, 1946 |
| 2,435,147 | McGregor | Jan. 27, 1948 |
| 2,448,556 | Sprung | Sept. 7, 1948 |